United States Patent [19]

Victor et al.

[11] 4,244,936

[45] Jan. 13, 1981

[54] RECOVERY OF TELLURIUM FROM ACIDIC SULFONATED ION EXCHANGE RESINS BY ACID ELUTION

[75] Inventors: James G. Victor, Haddonfield, N.J.; Richard B. Papp, Norwood; Alfred A. Wolsky, Ft. Washington, both of Pa.

[73] Assignee: Atlantic Richfield Company, Los Angeles, Calif.

[21] Appl. No.: 82,832

[22] Filed: Oct. 9, 1979

[51] Int. Cl.$^3$ .................... C01B 19/02; C01B 19/04
[52] U.S. Cl. .................... 423/509; 423/510; 560/246
[58] Field of Search .............. 560/246; 423/508, 509, 423/510

[56] References Cited

U.S. PATENT DOCUMENTS 4,073,876  2/1978  Gupta .................... 423/508

OTHER PUBLICATIONS

Cooper, Editor, *Tellurium*, Van Nostrand Reinhold Co., N.Y., N.Y. 1971 pp. 31–35, 46, 47, 286.
*Chemical Abstracts*, vol. 59 (1963).

*Primary Examiner*—Brian E. Hearn
*Attorney, Agent, or Firm*—Delbert E. McCaslin

[57] ABSTRACT

A process for the recovery of tellurium compounds which have been retained on a strongly acidic sulfonated ion exchange resin employed to remove soluble tellurium compounds from tellurium-containing vicinal glycol ester solutions, by elution of the resin with dilute mineral acids, such as hydrochloric, to form a tellurium-containing acid eluate and treating the eluate by stripping or distilling to remove contained water and acid leaving a tellurium compound concentrate which may be treated in the presence of air or oxygen to convert the tellurium to a form suitable for reuse in the preparation of vicinal glycol esters.

11 Claims, No Drawings

RECOVERY OF TELLURIUM FROM ACIDIC SULFONATED ION EXCHANGE RESINS BY ACID ELUTION

BACKGROUND OF THE INVENTION

In a co-pending application of A. A. Wolsky, R. B. Papp and J. G. Victor 82,833 filed simultaneously herewith and entitled REMOVAL OF SOLUBLE TELLURIUM COMPOUNDS FROM A CRUDE GLYCOL ESTER SOLUTION, there is disclosed a method for the removal of soluble tellurium compounds from vicinal glycol ester solutions which were prepared by the tellurium-halide ion catalyzed liquid phase oxidation of an olefin and an aliphatic monocarboxylic acid, by diluting the tellurium-containing reaction product (oxidate) solution with at least 50 per cent by weight water and contacting the dilute water-tellurium-containing oxidate solution with a strongly acidic sulfonated ion exchange resin to retain and remove the tellurium compounds from the oxidate solution.

The present invention is directed to an effective method of recovering the tellurium compounds which have been retained on the strongly acidic sulfonated ion exchange resins as a result of the process disclosed in the described co-pending application, by eluting the ion exchange resin with a dilute mineral acid and treating the resulting tellurium-containing acid eluate to recover the tellurium in a form suitable for reuse.

To place this invention in its proper context, the oxidation reaction employing the tellurium-halide ion catalyst as well as the removal of the soluble tellurium compounds from the resulting reaction product glycol ester (oxidate) solution as set forth in the co-pending application of A. A. Wolsky, R. B. Papp and J. G. Victor filed simultaneously herewith will be described and the interrelation between such processes and the process of this invention will be pointed out.

In the U.S. Pat. Nos. 3,479,395, 3,637,515, 3,668,239, 3,689,535, 3,715,388, 3,715,389, 3,743,672, 3,789,065, 3,907,874, 3,985,795, 4,045,477 and 4,073,876 there is disclosed processes for the preparation of vicinal glycol esters by the liquid phase oxidation of an olefin, such as ethylene or propylene in a carboxylic acid medium, such as acetic acid using a tellurium catalyst and a source of halide ions.

The present invention is directed to an effective method of recovering the tellurium retained on a strongly acidic sulfonated ion exchange resin which was employed to remove the soluble tellurium from crude vicinal glycol ester solutions produced, for example, by such above described processes and containing tellurium in the form of soluble inorganic tellurium compounds and soluble organo-tellurium compounds. Because of the high reactivity of tellurium, in combination with a halide source when used as a catalyst as in the above reaction its combination with organic compounds such as the carboxylic acids and olefins employed very frequently results in the formation of organo-tellurium compounds, such as tetra and divalent alkyl tellurium halides, tellurium carboxylate compounds and the compounds described for examples in an article by Jan Bergman, Kemisk Tedskrift, Vol. 88 (11) pp. 62-3, 1976 Sweden, entitled New Production Process for Ethylene Glycol as well as other soluble tellurium compounds which remain in solution with the glycol ester reaction product. In such reaction, a portion of the tellurium catalyst such as tellurium dioxide, etc. is itself or in combination with the halide source, converted to one or more organo-tellurium compounds. The type and number of organo-tellurium compounds which may be formed and which may be recovered is a function of the reaction conditions to produce the vicinal glycol ester such as time, temperature, carboxylic acid and any solvent which might be employed. In addition, at least some of the inorganic tellurium compounds used as catalysts or formed in the reaction, such as tellurium tetrabromide, may also remain in solution with the glycol ester product.

Because of the cost and toxicity of tellurium, it is essential that as much of the tellurium as is possible be removed from the glycol ester reaction product by the ion exchange resin and the retained inorganic or organo-tellurium compounds recovered from the ion exchange resin and converted to a form suitable for reuse as a catalyst in the oxidation reaction.

There is no known prior art which describes the removal of soluble inorganic or organo-tellurium compounds from a crude vicinal glycol ester reaction product, prepared by the tellurium catalyzed acetoxylation of olefins, by treating a water diluted solution of the glycol ester reaction product with a strongly acidic sulfonated ion exchange resin or the recovery of the tellurium from said resin by eluting the resin with a dilute mineral acid forming an eluate which may be treated to convert the tellurium to a reusable form.

SUMMARY OF THE INVENTION

This invention relates to a process for the recovery of tellurium from a strongly acidic sulfonated ion exchange resin which have retained thereon soluble tellurium compounds removed from tellurium-containing vicinal glycol ester solutions to produce an essentially tellurium-free glycol ester. More specifically, the present invention concerns a process for the elution of tellurium-containing strongly acidic sulfonated ion exchange resins with dilute mineral acids to form a tellurium-containing acid eluate and treating the eluate by stripping, distillation, etc. to remove contained water and recover the acid leaving a tellurium compound concentrate or residue which may be subjected to further treatment to convert the tellurium to a desired form for reuse.

A basic advantage of the precess of the present invention is the simplicity of removing the retained tellurium from the ion exchange resin and that elution may be in fractions allowing for concentration of the valuable tellurium compounds.

It is an object of this invention therefore to provide a process for the substantial recovery of valuable tellurium from tellurium-containing strongly acidic sulfonated ion exchange resins and the ultimate conversion of said tellurium to a form for recycle and reuse as a catalyst for the synthesis of vicinal glycol esters.

These and other objects and advantages of this invention will become apparent from the description of the invention which follows and from the claims.

DETAILED DESCRIPTION OF THE INVENTION

In accordance with the present invention, strongly acidic sulfonated ion exchange resins on which soluble tellurium compounds have been retained as a result of treating a water diluted tellurium-containing vicinal glycol ester solution, is eluted with a dilute mineral acid solution to remove the soluble tellurium compounds from the ion exchange resin and form a tellurium-containing dilute mineral acid eluate which is subjected to stripping or distillation to remove contained water and acid leaving a tellurium compound concentrate or residue. The tellurium compound concentrate or residue containing various tellurium compounds may be treated to recover the tellurium in catalytically useful form. One method is to convert the tellurium, in the presence of air or oxygen, to tellurium dioxide at temperatures of from about 600° C. to 1000° C. preferably 700° C. to 950° C. and recover the TeO$_2$ from the effluent reactor stream by cooling to collect the TeO$_2$. Methods of precipitation and extraction of the tellurium from the eluate prior to or after distillation may also be employed.

As is described in the above-mentioned co-pending application of A. A. Wolsky, R. B. Papp and J. G. Victor the amount and type of tellurium compounds in the crude vicinal glycol ester reaction product, and thus, retained on the ion exchange resin to be recovered by the process of this invention, will generally depend on the type and amount of tellurium compound and halide ion source employed to produce the vicinal glycol ester as well as the reaction conditions and the ester being produced. The amount of soluble tellurium in the form of inorganic tellurium compounds and/or organo-tellurium compounds in the glycol ester treated by the ion exchange resin and thus retained thereon and which may be recovered by the process of this invention can range from about 0.25 per cent to 1.5 per cent or more by weight.

Strongly acidic sulfonated ion exchange resins which have soluble tellurium compounds retained thereon and which may be subjected to elution by the process of the present invention may have a bulk density of approximately 595 g./l., a hydrogen ion concentration of approximately 4.9 milliequivalents/g. dry, a surface area of from about 40 to 50 m$^2$/g. and an average pore diameter of from about 200 to 600 Angstrom units. (Such compounds are sold, for example, commerically as "Amberlyst-15" a strongly acidic sulfonated poly aromatic ion exchange resin by Rohm and Haas Co.) Strongly acidic perfluoroalkane sulfonic acid resins which have soluble tellurium compounds retained thereon (sold, for example, commercially as "Nafion" by the DuPont Co.) may also be treated by the process of the present invention and generally have an equivalent weight of between about 1000 and 1500, a hydrogen ion concentration of between about 0.7–1.0 milliequivalents/g. dry, and prepared, for example, by polymerization of tetrafluoroethylene with a sulfonyl fluoride vinyl ether, followed by saponification with caustic to form the alkali metal salt and treatment with an acid to convert the salt to the sulfonic acid form.

The dilute mineral acids (aqueous solutions) employed to elute the soluble tellurium compounds from the strngly acidic sulfonated ion exchange resin may be hydrochloric, hydrobromic, phosphoric or sulfuric acid. Acid concentrations of from about 0.1 Normal and 5.0 Normal and preferably from about 1 Normal to 2 Normal may be employed to form the tellurium-containing acid eluate. Carboxylic acids with dissociation constants $\leq 1.75 \times 10^{-5}$ will not elute tellurium from the ion exchange resins in any appreciable amount if at all.

The process of this invention may be carried out at temperatures of from about 5° C. to 95° C. and are preferably carried out at temperatures between about 15° C. and 30° C. or ambient temperature.

The following Examples are provided to illustrate the recovery of soluble tellurium compounds from strongly acidic sulfonated ion exchange resins, employed to remove and retain soluble tellurium compounds from tellurium-containing vicinal glycol ester solutions, in accordance with the principles of this invention but are not to be construed as limiting the invention in any way except as indicated by the claims.

In the Examples which follow the elution of tellurium was carried out in a glass column containing a strongly acidic sulfonated ion exchange resin ("Amberlyst-15" of Rohm and Haas Co. or "Nafion" of the Dupont Co.) having tellurium compounds retained thereon as a result of treating a crude tellurium-containing reaction product ethylene glycol diacetate solution which was obtained by taking the effluent from a tellurium oxide catalyzed conversion of ethylene with acetic acid, hydrobromic acid, 2-bromo-ethyl acetate and oxygen as described in U.S. Pat. No. 3,715,389 and which had been diluted with at least 50 per cent by weight water.

EXAMPLE 1

A glass column containing 25 ml of a strongly acidic sulfonated ion exchange resin ("Amberlyst-15" of Rohm and Haas Co.) having 0.3526 grams total tellurium retained thereon after treating 456 grams of a solution of 20 grams crude reaction product ethylene glycol diacetate solution (containing approximately 61.9 per cent acetate and formate esters of ethylene glycol and diethylene glycol, 1.0 per cent hydrobromic acid, 1.0 per cent bromoacetic acid, 0.4 per cent total tellurium as soluble tellurium compounds, 5.0 per cent water, 24.7 per cent acetic acid and 6.0 per cent unidentified high molecular weight by- product materials) diluted with 80 grams water, was eluted with 131 grams of 1N. hydrochloric acid. Atomic absorption analysis of the tellurium-containing acid eluate showed that 0.3416 grams total tellurium was eluted from the ion exchange resin giving a 96.9 percent recovery.

EXAMPLE 2

A glass column containing 150 ml of a strongly acidic sulfonated ion exchange resin ("Amberlyst-15" of Rohm and Haas Co.) having 1.5264 grams total tellurium retained thereon after the treatment of 2493 grams of a 80/20 percent water/crude reaction product ethylene glycol disacetate solution (the glycol solution containing approximately 61.9 percent acetate and formate esters of ethylene glycol and diethylene glycol, 0.8 percent hydrobromic acid, 1.2 percent bromoacetic acid, 0.3 percent total tellurium as soluble tellurium compounds, 5.0 percent water, 24.8 percent acetic acid and 6.0 percent unidentified high molecular weight by-product material) was eluted with 1 N. hydrochloric acid at a rate of 1.5 ml/minute and fractions of tellurium-containing eluate taken and analyzed by atomic absorption for tellurium content. Results were as follows:

| Fraction | Wt. Grams | Wt. Te in eluate (grams) |
|---|---|---|
| 1 | 107 | 0.0015 |
| 2 | 342 | 1.1279 |
| 3 | 472 | 0.3496 |

Total tellurium eluted from the resin was 1.4790 grams giving a 96.9 percent recovery.

EXAMPLE 3

Example 2 was repeated employing 1 N. sulfuric acid to elute 150 ml of a strongly acidic sulfonated ion exchange resin ("Amberlyst-15" of Rohm and Haas Co.) having a total of 1.538 grams total tellurium retained thereon after treatment of 2500 grams of the crude reaction product ethylene glycol diacetate solution. Analysis by atomic absorption showed a total of 1.497 grams tellurium was eluted from the resin giving a 97.3 percent recovery of tellurium.

EXAMPLE 4

A glass column containing 25 ml. of a strongly acidic sulfonated resin ("Nafion" of the DuPont Co.) having 0.3610 grams total tellurium retained thereon after treating 475 grams of the diluted crude reaction product ethylene glycol diacetate solution of Example 1, was eluted with 150 grams of 1 N. hydrochloric acid. Atomic absorption analysis of the tellurium-containing acid eluate showed that 0.356 grams total tellurium was eluted from the resin giving a 98.6 percent recovery. The tellurium-containing acid eluate was distilled at a temperature of up to about 120° C. to remove contained water and acid leaving a tellurium compound concentrate which was further treated by heating to a temperature of 850° C. in the presence of air to convert the tellurium contained in the concentrate to tellurium dioxide which was recovered by cooling the effluent air-TeO$_2$ stream to collect the TeO$_2$.

We claim:

1. A process for the removal and recovery of tellurium from a strongly acidic sulfonated ion exchange resin, derived from treating a tellurium-containing vicinal glycol ester solution to remove and retain soluble tellurium compounds, which comprises the steps of:
    eluting the ion exchange resin at a temperature of from about 5° C. to 95° C. with a dilute mineral acid at concentrations of from about 0.1 Normal to 5.0 Normal to form a tellurium-containing acid eluate;
    stripping or distilling the tellurium-containing acid eluate to remove contained water and acid leaving a tellurium compound concentrate; and
    recovering tellurium from said tellurium concentrate.

2. A process according to claim 1 wherein the resin is eluted at a temperature of from about 15° C. to 30° C.

3. A process according to claim 1 wherein the dilute mineral acid is at a concentration of between about 1 Normal and 2 Normal.

4. A process according to claim 1 wherein the mineral acid is selected from the group consisting of hydrochloric, hydrobromic, phosphoric and sulfuric acid.

5. A process according to claim 4 wherein the acid is hydrochloric acid.

6. A process according to claim 4 wherein the acid is sulfuric acid.

7. A process according to claim 1 wherein the strongly acidic sulfonated ion exchange resin is selected from the group consisting of sulfonated polyaromatic ion exchange resins or perfluoroalkane sulfonic acid resins.

8. A process according to claim 7 wherein the ion exchange resin is a sulfonated polyaromatic ion exchange resin.

9. A process according to claim 1 wherein the tellurium compound concentrate is treated with air or oxygen at a temperature of from about 600° C. to 1000° C. to convert the contained tellurium to tellurium dioxide and recovering said tellurium dioxide.

10. A process according to claim 9 wherein the treatment is carried out at a temperature of from about 700° C. to 950° C.

11. A process for the removal and recovery of tellurium from a strongly acid sulfonated polyaromatic ion exchange resin, derived from treating a tellurium-containing ethylene glycol diacetate solution to remove and retain soluble tellurium compounds, which comprises the steps of:
    eluting the sulfonated polyaromatic ion exchange resin at a temperature of from about 15° C. to 30° C. with a dilute hydrochloric acid having a concentration of from about 1 Normal to 2 Normal to form a tellurium-containing hydrochloric acid eluate;
    distilling the acid eluate at a temperature of 120° C. to remove contained water and acid leaving a tellurium compound concentrate;
    treating the tellurium compound concentrate with air at a temperature of from about 700° C. to 950° C. to convert the contained tellurium to tellurium dioxide; and
    recovering said tellurium dioxide by cooling the TeO$_2$-air effluent.

* * * * *